July 5, 1960  F. F. JOHNSON ET AL  2,944,148
APPARATUS FOR INVESTIGATING EARTH FORMATIONS
Filed July 2, 1954  5 Sheets-Sheet 1
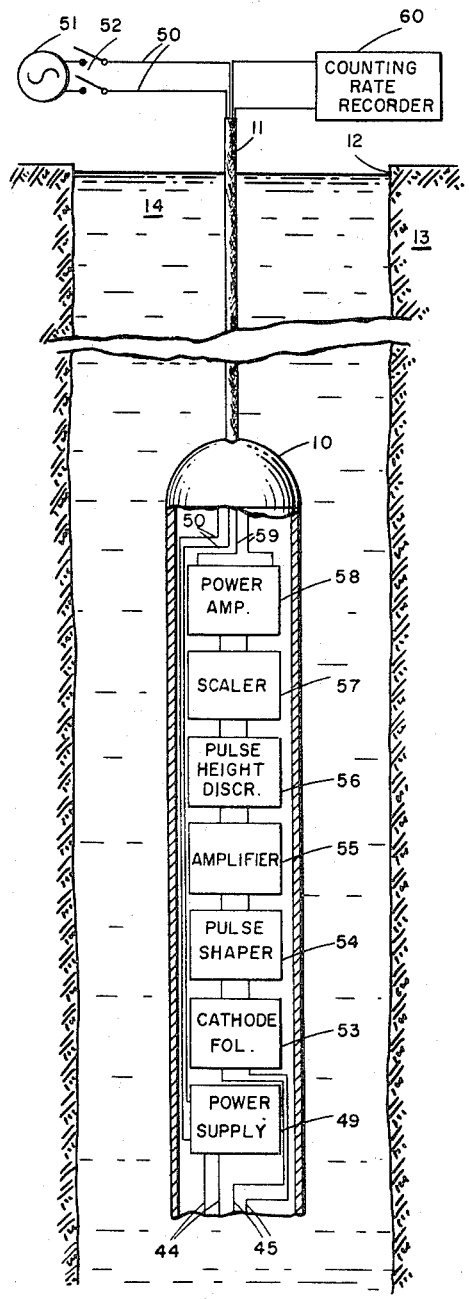
FIG. IA
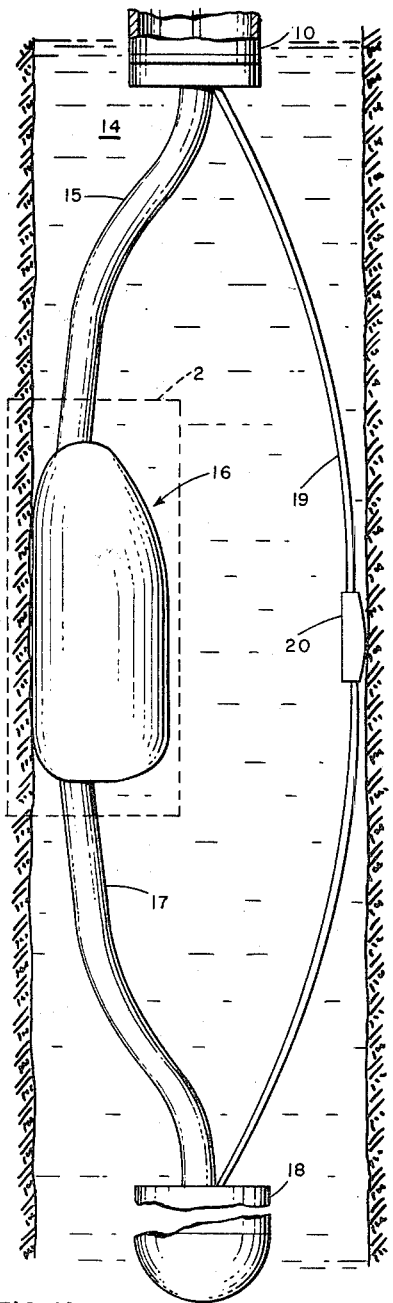
FIG. IB
INVENTORS
FRANK F. JOHNSON
JAY TITTMAN
BY Robert Hockfield
THEIR ATTORNEY July 5, 1960   F. F. JOHNSON ET AL   2,944,148
APPARATUS FOR INVESTIGATING EARTH FORMATIONS
Filed July 2, 1954   5 Sheets-Sheet 2

INVENTORS
FRANK F. JOHNSON
JAY TITTMAN
BY
Robert Hockfield
THEIR ATTORNEY

July 5, 1960  F. F. JOHNSON ET AL  2,944,148
APPARATUS FOR INVESTIGATING EARTH FORMATIONS
Filed July 2, 1954   5 Sheets-Sheet 4

*INVENTORS*
FRANK F. JOHNSON
JAY TITTMAN
BY
Robert Hockfield
THEIR ATTORNEY

July 5, 1960   F. F. JOHNSON ET AL   2,944,148
APPARATUS FOR INVESTIGATING EARTH FORMATIONS
Filed July 2, 1954   5 Sheets-Sheet 5

INVENTORS
FRANK F. JOHNSON
JAY TITTMAN
BY
Robert Hockfield
THEIR ATTORNEY

United States Patent Office 2,944,148
Patented July 5, 1960

2,944,148

APPARATUS FOR INVESTIGATING EARTH FORMATIONS

Frank F. Johnson and Jay Tittman, Danbury, Conn., assignors, by mesne assignments, to Schlumberger Well Surveying Corporation, Houston, Tex., a corporation of Texas Filed July 2, 1954, Ser. No. 441,064

12 Claims. (Cl. 250—71)

This invention relates to apparatus for investigating the earth formations traversed by a well or borehole and, more particularly, pertains to new and improved apparatus of the type including a source for irridiating the formations with gamma radiation and a detector for obtaining indications of gamma radiation affected by the formations.

Recent investigations have revealed that information concerning the density of earth formations is of great utility. For example, where the grain density and interstitial fluid density of a formation are known, a density log may be converted directly to a total porosity log. The latter characteristic, of course, is useful in estimating the reservoir capacity of hydrocarbon-containing formations.

Moreover, density is of interest as a factor influencing seismic velocity. This is understandable since a better knowledge of subsurface densities may permit improved interpretation of seismic surveys.

In addition, density information aids the interpretation of gravity surveys inasmuch as the depths of formations exhibiting gravitational anomalies are usually difficult to determine with present techniques.

Apparatus has been proposed for obtaining a log of formation density utilizing a source of gamma radiation and a gamma ray detector. However, the precision of these measurements is too low to be of any great utility in the applications enumerated hereinbefore.

It is, therefore, an object of the present invention to provide new and improved logging apparatus utilizing gamma radiation for determining formation density with greater precision than heretofore possible.

Apparatus in accordance with the present invention for investigating earth formations traversed by a well or borehole comprises an instrument adapted to be passed through a borehole. The instrument includes a wall-engaging face and means are provided for maintaining the wall-engaging face in engagement with the sidewall of the borehole. A source of gamma radiation is supported within the instrument in the vicinity of the wall-engaging face. The apparatus further comprises a detection system including a gamma-ray-responsive device supported within the instrument in the vicitiny of the wall-engaging face, and longitudinally spaced from the source relative to the axis of the borehole. The detection system additionally includes an element coupled to the gamma-ray-responsive device and contained by an extension of the instrument that is tilted relative to a longitudinal line of the wall-engaging face in a direction toward the axis of the borehole.

The novel features of the present invention are set forth with particularity in the appended claims. The present invention, both as to its organization and manner of operation, together with further objects and advantages thereof, may best be understood by reference to the following description taken in connection with the accompanying drawing in which:

Figs. 1A and 1B represent the upper and lower sections, respectively, of well logging apparatus constructed in accordance with the present invention shown in operative association with a borehole, certain details of Fig. 1A being shown schematically;

Figure 2:
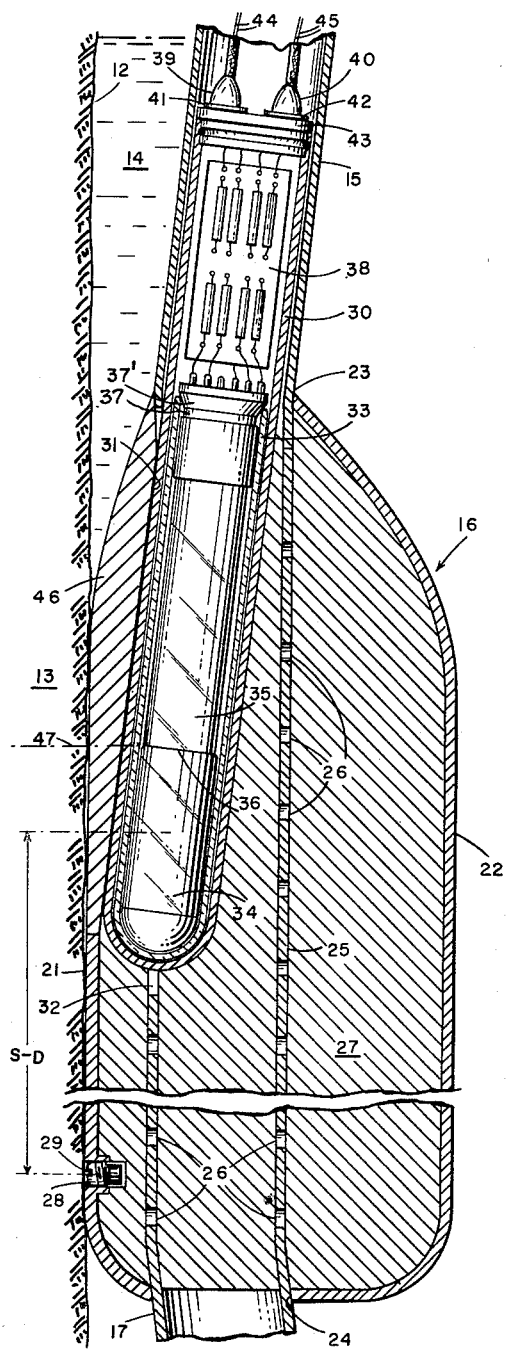
Fig. 2 is an enlarged view in longitudinal cross-section of a portion of Fig. 1B outlined by rectangle 2.

As shown in Fig. 1A of the drawings, the well logging apparatus embodying the present invention comprises a housing 10 suspended by an armored cable 11 in a borehole 12 traversing earth formations 13 and which may be filled with a drilling liquid 14, such as a water base or oil base mud. The cable 11 may be employed in association with a winch (not shown) to lower and raise housing 10 in the borehole in a customary manner.

Housing 10 is of conventional pressure-resistant construction to protect various electronic circuits, to be described hereinafter, from the drilling mud 14. The lower end of housing or electronic cartridge 10 is connected to a tubular support 15, represented in Fig. 1B, having a compound curve configuration so that it extends downwardly and toward the sidewall of the borehole. Attached to support 15 is another generally-cylindrical instrument or wall-engaging "skid" 16 connected by an integral extension 17 of tube 15 to a weighted member 18. Tube portion 17 is of a curved configuration similar to portion 15, but it extends downwardly and away from the sidewall of the borehole.

Cartridge 10 and weight 18 are connected together by a conventional bowed spring 19 provided with a sidewall-engaging shoe 20. The curvature and resilience of spring 18 are arranged in a known manner so that a wall-engaging face 21 of instrument 16 is maintained in engagement with the sidewall of borehole 12 as the assembly traverses the borehole.

With reference now to Fig. 2, instrument 16 is comprised of a thin-walled steel container or housing 22 having upper and lower openings 23 and 24 which conform to the diameters of tube portions 15 and 17. These tube portions are integrally connected by a tube 25 which extends longitudinally through pad 16 in essentially parallel relation to face 21. Tube 25 is provided with a plurality of openings so that molten lead may be introduced and thus the lead, after it solidifies, forms a gamma ray shield 27 which essentially fills the container 22 as well as tube portion 25. Of course, other shield materials of high density and high atomic number may be employed. In addition, if desired, tube portion 25, as well as portions 15 and 17, may be constructed of a material substantially impervious to gamma radiation, as an alloy of tungsten, copper, and nickel, commonly referred to under the trade names Hevimet or Mallory 1000.

A threaded opening 28 is provided in the vicinity of the lower end of sidewall-engaging face 21. This opening receives the entirety of a pellet of radium or cobalt 60, or, as shown, of a screw 29 composed of cobalt 60 previously made radioactive by conventional techniques. As is well-known, radioactive cobalt is a prolific producer of gamma radiation and thus the apparatus embodying the invention includes a source for irradiating earth formations 13 with gamma rays.

The apparatus further includes a detection system for obtaining a log of the gamma radiation affected by the earth formations. A portion of the detection system is contained by an aluminum pressure housing 30 received by an opening or bore 31 in shield 27 of pad 16 that is aligned at its upper end with opening 23. In order to bring a portion of the detection system, to be later described, in close association with the sidewall of the borehole 12 and yet keep the longitudinal length of sidewall-engaging face at a minimum, bore 31 is tilted relative to a longitudinal line of face 21 in a direction toward the axis of borehole 12, and a cut out 32 is provided in the front face of tube portion 25 to accommodate this tilt. Housing 30 may be considered as an extension of instrument 16, and to receive a portion of housing 30 which projects out of opening 23, tube 15 is aligned, in part, with bore 31.

Supported within housing 30 by appropriate resilient means (not shown) is a conventional twin-walled Dewar flask 33. A scintillation element 34, such as a cylindrical crystal of sodium iodide, is disposed at the lower end of Dewar flask 33 and by virtue of the tilt of bore 31 is positioned relatively close to face 21. Also disposed within flask 33 is a conventional photomultiplier tube 35 having its end window 36 optically coupled to the crystal 34. The Dewar flask 33 thermally insulates both crystal 34 and photomultiplier 35 from drilling mud 14 thereby minimizing any detrimental effects which may result from high temperatures sometimes encountered in a borehole.

Electrical connections to the photomultiplier may be completed by means of a socket 37 included in an end closure 37' for the Dewar flask. Circuit elements for use with the photomultiplier are supported on a chassis 38 disposed above closure 37'.

Electrical connectors 39 and 40 are associated with corresponding sockets 41 and 42 of a cap 43 which closes housing 30. Thus, electrical input and output conductors 44 and 45 may be connected to the photomultiplier circuit, although housing 30, together with its cap 43, constitutes a pressure-resistant container.

To displace drilling mud 14 from in front of scintillation element 34, the upper front portion of container 22 and shield 27 are cut away to receive a member 46 that is essentially transparent to gamma rays. For example, mud displacer 46 may be constructed of aluminum and is so formed that it conforms to the cylindrical configuration of wall-engaging face 21. That is, below a horizontal plane, represented by dash line 47 and defined by the uppermost extremity of scintillation element 34, member 46 functions as an essentially straight continuation of face 21 thereby to minimize the amount of drilling mud that may come between the face and the sidewall of the borehole. However, in order to keep the wall-engaging face 21 as short as possible to facilitate good wall contact, member 46 curves gradually above plane 47 and provides a smooth transition at its junction with tube 15. The configuration of member 46 may be best appreciated from an examination of the perspective representation in Fig. 3, which shows it to have a semicylindrical inner face 48 which corresponds to the shape of housing 30.

The longitudinal distance between the geometric centers of source 29 and detector crystal 34, denoted in Fig. 2 by the characters S—D, is selected to provide a desired operating characteristic. The manner in which this S—D spacing is determined will be apparent from a discussion to be presented hereinafter.

Referring once again to the electronic cartridge 10 illustrated in Fig. 1, power conductors 44 for the photomultiplier circuit are connected to a power supply 49 which is energized via insulated conductors 50 of cable 11 by a power source 51 at the surface of the earth provided with an operating switch 52.

The pulse signal from the photomultiplier is supplied over conductors 45 to a cathode follower 53, employed for its characteristically high input impedance and low output impedance coupled to a pulse shaper 54. Pulse shaper 54 may, for example, be a delay line, for deriving pulses of proportional height but of reduced duration compared to the pulses applied to it. The shaper 54 is coupled to an amplifier 55, in turn, coupled to a pulse height discriminator 56 adjusted so that pulses of relatively low amplitudes usually caused by extraneous dark current of the photomultiplier 35 are not applied to the succeeding stage which in this case is a scaler 57. The scaler is employed since counting rates of the order of $10^4$ counts per second are required in order to realize, in practice, the accuracy inherent in this device, and conventional cables do not readily transmit pulses at this rate at low power. The scaler is coupled to a power amplifier 58 connected by insulated conductors 59 of cable 11 to a counting rate recorder 60 at the surface of the earth in which the recording medium is displaced in proportion to movement of instrument 16 in the borehole. Thus, a continuous log of counting rate versus depth may be obtained.

Circuit elements 49, 53, 54, 55, 56, 57, 58 and 60 may be of conventional construction and thus they need not be described in detail.

In operation, the assembly including housing 10, instrument 16 and the associated elements is lowered into borehole 12 below the formations to be logged. Switch 52 is closed and the assembly is raised at a normal logging speed, while spring 19 maintains face 21 of instrument 16 in engagement with the sidewall of the borehole. Gamma radiation from source 29 irradiates the formations and after being affected by formation material some of this gamma radiation is intercepted by scintillation crystal 34. As is well-known, crystal 34 operates as a gamma ray transducer and in response to each quantum of incident gamma radiation, a pulse of light is derived having an energy content proportional to the gamma ray energy dissipated in the crystal. The rate of occurrence of such pulses is dependent on the flux of gamma radiation. Each such light pulse is converted to an amplified pulse of electrical energy, the amplitude of which is proportional to the energy of the light pulse, by the photomultiplier 35 and thus a succession of pulses is supplied via cathode follower 53 to pulse shaper 54. The pulses, after a reduction in duration in shaper 54, are amplified in stage 55 and applied via discriminator 56 to scaler 57. The counting rate of the pulses supplied by the scaler to amplifier 58, of course, is proportional to the counting rate of the pulses developed by photomultiplier 35. The counting rate recorded by unit 60 as a function of depth in the borehole represents the gamma ray flux incident on scintillation element 34. As will be more apparent from the following discussion, the intercepted gamma ray flux is a measure of formation density, and therefore, a density log is obtained by means of the apparatus embodying the present invention.

The principles of operation and the manner of selecting the best mode of carrying out the present invention may be best appreciated in view of certain theoretical and experimental considerations. These considerations, although useful in the practice of the invention, should not be deemed as in any way limiting its scope.

In general, gamma rays below an energy of approximately 0.1 million electron volts (m.e.v.) interact with matter in a process which eliminates the gamma rays, known as the photoelectric effect. Another process which takes place is known as the Compton effect whereby the energy of each gamma ray is reduced and its direction is changed. The probability of a Compton interaction within a given volume of matter depends on the energy of the gamma ray and on the number of electrons per cubic centimeter, usually referred to as the electron density. The probability of photo-electric interaction depends on the gamma ray energy, on the number of atoms per cubic centimeter, and on the type of atoms present. The foregoing factors suggest that gamma rays may be used to determine the electron density of subsurface formations and also to indicate the type and density of nuclei present, depending upon the gamma ray energy of the source used.

One method of measuring electron density of a formation is to use the formation as a gamma ray reflector. For example, a source of gamma radiation and a very closely spaced gamma ray detector may be employed. Gamma radiation from the source is Compton-scattered and some of the scattered gamma rays are intercepted by the detector. It has been observed that in this arrangement, the intercepted gamma ray flux varies directly with electron density. However, experiment has shown that the depth of investigation of the short or zero spacing source and detector is impractically small for borehole logging purposes.

On the other hand, by using apparatus constructed in accordance with the present invention, wherein a relatively large source-detector spacing is employed, electron density is measured through the use of the formation as both scatterer and absorber. As the electron density of the medium under investigation increases, the amount of gamma radiation that is absorbed increases. Thus the gamma ray flux at the detector is, in general, inversely related to the electron density of the formations.

It is evident that both scattering and absorption, which increase together, are involved in large source-detector spacing apparatus. Because of this, electron density is a double-valued function of counting rate, in turn, representative of intercepted gamma ray flux. A very dense formation exhibits a large absorption and a very tenuous formation provides little scattering; both result in low counting rates. There is also a range of source-detector spacings such that for formation densities normally encountered in borehole logging, counting rates increase with density. In addition, there are spacings larger than the last-mentioned spacings for which counting rates decrease with increasing density.

Before proceeding with a discussion of the selection of source-detector spacing, it may be helpful first to examine the significance of electron density measurements which may be made with the apparatus illustrated in Figs. 1 and 2.

Figure 4:
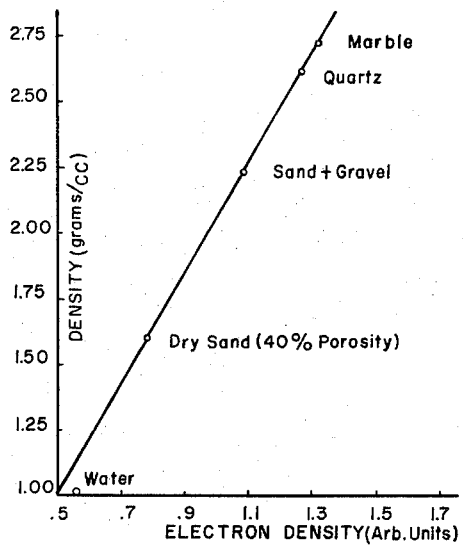
Figs. 4 through 10 are graphs useful in explaining the various characteristics of the invention.

It has been found that the dominant effect in obtaining a log with equipment of this type is that of Compton scattering, although the photoelectric effect at the K-shell energy and somewhat above may cause a small perturbation. The Compton effect depends only upon the electron density in a formation. Hence, it is important to establish the relationship of electron density, $\rho_e$, to the bulk density $\rho$. In Fig. 4, the mass density versus electron density for various formation materials is illustrated. However, in order to interpret the logs obtained with the apparatus of Figs. 1-2, this must be examined in greater detail.

The number of atoms per unit volume, $\rho_a$ (or the number of moceules, if the quantity A is taken as the mocular rather than the atomic weight), is:

$$\rho_a = \frac{N_0}{A}\rho \qquad (1)$$

where $N_0$=Avogadro's number and A=atomic weight of the element. If there are Z (atomic number) electrons per atom, or molecule, as the case may require, from Equation 1, $$\rho_e = Z\rho_a = N_0\left(\frac{Z}{A}\right)\rho \qquad (2)$$

Now if a rock matrix, represented by $r$, is present having a porosity, $\phi$, and filled with a fluid, $f$, it may be shown from Equation 2 that $$\rho_e = N_0\left[\left(\frac{Z}{A}\right)_f \rho_f \phi + \left(\frac{Z}{A}\right)_r \rho_r(1-\phi)\right] \qquad (3)$$

or $$\rho_e = N_0\left[\rho_r\left(\frac{Z}{A}\right)_r - \phi\left\{\rho_r\left(\frac{Z}{A}\right)_r - \rho_f\left(\frac{Z}{A}\right)_f\right\}\right] \qquad (4)$$

From Equation 4 it may be seen that the electron density is dependent only on the bulk density only if the quantity $$\left(\frac{Z}{A}\right)$$

is constant. The quantities $$\left(\frac{Z}{A}\right)_f \text{ and } \left(\frac{Z}{A}\right)_r$$

as used here, of course, represent the ratios of the Z and A for the "molecules" of the interstitial fluid and rock matrix, respectively, suitably averaged, if necessary. The assumption may be made that $$\left(\frac{Z}{A}\right)$$

is precisely ½ for all elements (and thus all compounds), and the extent to which this is not true is a measure of the extent to which the electron density does not vary linearly with the bulk density of earth formations. Furthermore, an examination of Equation 4 indicates the extent to which various substitutions, such as oil for water in the pores of a formation, or limestone for sand as the matrix may perturb the log since each of these constituents is represented by the characterizing parameters, $$\left(\frac{Z}{A}\right) \text{ and } \rho$$

It is a fortuitous circumstance that the two most important constituents of rock matrices are $SiO_2$ and $CaCO_3$, both of which have $$\left(\frac{Z}{A}\right) = \frac{1}{2}$$

to within about 0.2%. Large variations in $$\left(\frac{Z}{A}\right)$$

among rock matrices would make the log useless for density determination since the response would then depend on the chemical nature of the formation as well as upon its bulk density. However, water ($H_2O$) and hydrocarbon $(CH_2)_n$, the principal interstitial fluids, have $$\left(\frac{Z}{A}\right)$$

values which are greater than ½ by about 10%, an amount which is appreciable in view of the accuracy with which the present type of log must be made in order to be useful practically.

Thus, the effect of deviations of $$\left(\frac{Z}{A}\right)$$

from ½ by taking the ratio of $$\rho_e\left(\frac{Z}{A}\right) \text{ to } \rho_e(\tfrac{1}{2})$$

using Equation 4 will be investigated. Measuring the rock matrix density in units of interstitial fluid density, such that $$\rho'_r = \frac{\rho_r}{\rho_f} \qquad (5)$$

this ratio becomes:

$$\frac{\rho_e\left(\frac{Z}{A}\right)}{\rho_e(\frac{1}{2})} = 2\left(\frac{Z}{A}\right)_r \frac{1-\phi\left[1-\frac{1}{\rho'_r}\frac{Z_f}{A_f}\frac{A_r}{Z_r}\right]}{1-\phi\left[1-\frac{1}{\rho'_r}\right]} \quad (6)$$

In determining $$\rho_e\left(\frac{Z}{A}\right)/\rho_e(\frac{1}{2})$$

from Equation 6 it is assumed that $\rho_f = 1$ for both water and hydrocarbon. This introduces some error since the densities of these two are not exactly equal. Moreover, the density of water increases fairly rapidly with salinity and decreases fairly rapidly with increasing temperature. However, the calculated effect still represents the contribution due to $$\left(\frac{Z}{A}\right)$$

not being exactly ½.

Figure 5:
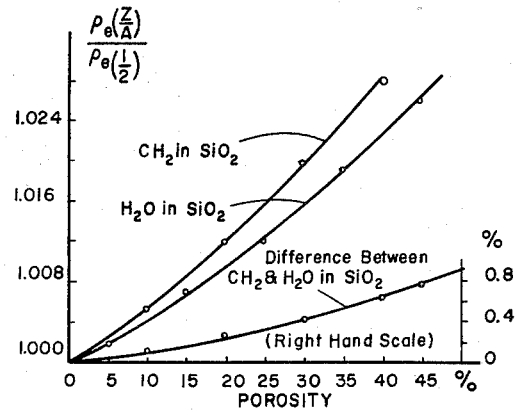

In Fig. 5, the plotted curves represent the ratio $$\rho_e\left(\frac{Z}{A}\right)/\rho_e(\frac{1}{2})$$

as a function of porosity for $H_2O$ in $SiO_2$ and $(CH_2)_n$ in $SiO_2$, calculated from the above Equation 6. It will be observed that if $\rho_e$ were truly independent of $$\left(\frac{Z}{A}\right)$$

the ratio $$\rho_e\left(\frac{Z}{A}\right)/\rho_e(\frac{1}{2})$$

would be a horizontal straight line having the value unity. Since the presence of H perturbs the situation, the non-linearity of $$\rho_e\left(\frac{Z}{A}\right)$$

with $\rho$ increases with increasing porosity. However, it may be seen from Fig. 5 that the maximum value of this non-linearity is only 2.6% at a porosity of 45% for $H_2O$ in $SiO_2$. This is the highest porosity usually encountered in logging with apparatus embodying the present invention.

Figure 3:
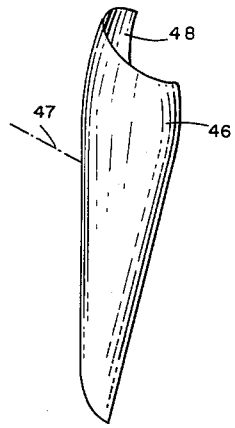
Fig. 3 is a perspective view of a portion of the apparatus shown in Fig. 2.

If the fluid and the matrix were perfectly arbitrary, this deviation from linearity could be significant since it has been found desirable to measure $\rho$ itself to within 2.5%. The non-linearity would then require a knowledge of the specific nature of the fluid before the density could be determined. However, since the fluid is usually known to fall in a limited class (either $(CH_2)_n$ or $H_2O$), there need be no concern with the proportionality of $\rho_e$ with $\rho$ so much as with the differences in degree of non-linearity as the fluid changes. Thus, in Fig. 5, there is shown another curve for $(CH_2)_n$ as the interstitial fluid and also the difference curve between $H_2O$ and $(CH_2)_n$. It may be seen that although $\rho_e$ is not rigorously proportional to $\rho$, it does stand in one-to-one correspondence independent of whether the fluid is $(CH_2)_n$ or $H_2O$, to within better than 0.8%, at least if the corrections for temperature, salinity, etc., mentioned above are ignored. The practical significance of this is that if the apparatus of Figs. 1–3 is calibrated in $SiO_2 + H_2O$, this calibration may be employed for $SiO_2 + (CH_2)_n$ as well.

The next problem to be considered is the correlation of a density measurement with porosity of an earth formation, assuming a given interstitial fluid. It should be noted that this assumption need not be made since, as pointed out hereinbefore, even if the fluid changes from $H_2O$ to $(CH_2)_n$, $\rho_e$ does not change appreciably. Inasmuch as $CaCO_3$ and $SiO_2$ have practically identical $$\left(\frac{Z}{A}\right)$$

values, the only quantity on the right hand side of above Equation 4 which differs for those two matrices is $\rho_r$. Rather than actually calculating $\rho_e$ for those two matrices, the difference, or the fractional change in $\rho_e$ for a given fractional change in $\rho_r$, will provide significant information. Differentiating Equation 4 with respect to $\rho_r$ and dividing by $\rho_r$ leads to $$\frac{\Delta\rho_e}{\rho_e} = \left[\frac{1-\phi}{1-\phi\left\{1-\frac{Z_f}{A_f}\frac{A_r}{Z_r}\frac{1}{\rho'_r}\right\}}\right]\left(\frac{\Delta\rho_r}{\rho_r}\right) \quad (7)$$

The factor in the brackets of Equation 7 may be recognized as the fractional change in electron density per unit fractional change in bulk density of the rock matrix as a function of porosity. The quantity $$\frac{\Delta\rho_r}{\rho_r}$$

may be taken as the fractional difference in density between a limestone matrix and a sandstone matrix, which is 0.022.

Figure 6:
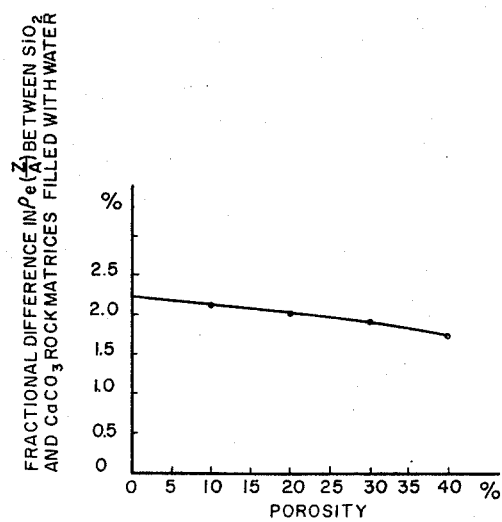

In Fig. 6, there is shown a curve representing the fractional change in electron density as a function of porosity. It is evident that over the illustrated porosity range of interest, there is every little variation in the difference between $\rho_e(SiO_2)$ and $\rho_e(CaCO_3)$ and the mean difference itself is only 2.0%.

Thus, in practice, the apparatus of Figs. 1–2 may be calibrated, for example in $SiO_2 + H_2O$ to determine the porosity response and this calibration may then corrected very simply for use in limestone formations. The correction may be carried out in the following fashion. Equation 4 is differentiated with respect to $\phi$ and by transposing and dividing by $\rho_e$ the following relation is obtained $$d\phi = \left[\phi - \frac{1}{1 - \frac{Z_f}{A_f}\frac{A_r}{Z_r}\frac{1}{\rho'_r}}\right]\frac{d\rho_e}{\rho_e} \quad (8)$$

which expresses the shift in porosity with a given fractional shift in $\rho_e$. The fractional shift in $\rho_e$ may be taken as the fractional difference brought about by replacing $SiO_2$ with $CaCO_3$, using the result of Equation 7. Stated another way, whereas Equation 7 gives the change in electron density due to a change in bulk density of the rock matrix, it is desirable to convert this into the corresponding apparent change in porosity. Substitution of the appropriate numbers in Equation 8 yields $$\Delta\phi = -(1.70 - \phi)\frac{\Delta\rho_e}{\rho_e} \quad (9)$$

It was shown earlier that $$\frac{\Delta\rho_e}{\rho_e} \approx 0.02$$

for the case of a change of matrix from $SiO_2$ to $CaCO_3$. Hence, a zero porosity sandstone will give the same response as a 3.4% porosity limestone, a 20% porous sand will appear as a 23% porous limestone, and a 40% porous sand will look like a 42.6% porous limestone. An average correction of 0.03 porosity units may then be employed in such a fashion that if the formations were known to be a limestone and the apparatus has been calibrated in sandstones, the porosity may be read from the calibration curve and then 0.03 porosity units added. The correction is small for the small differences in $\rho_r$ found in earth formations and is well defined. Consequently, a fairly unique value of porosity may be determined.

The significance of this analysis lies in the fact that, if Compton effect is the dominant form of interaction with the formation, the electron density is the only quantity of significance. The energy of the source included in the apparatus of Figs. 1 and 2 may be selected so that this condition is satisfied. Accordingly, apparatus embodying the present invention may be employed to obtain a log which is accurately representative of formation density as a function of depth in the borehole.

Figure 7:
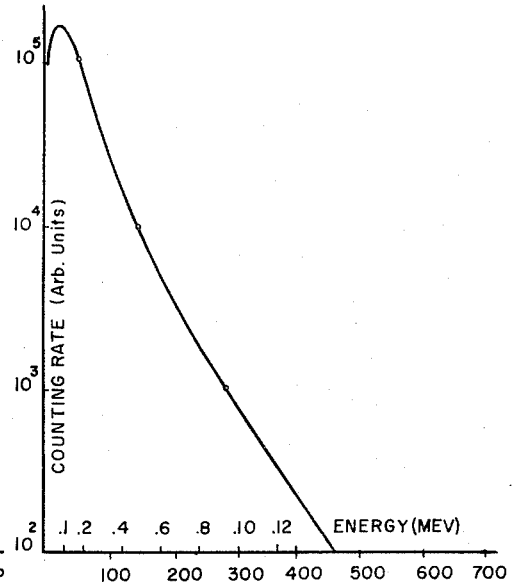

In experiments intended to determine the best spacing between the source and detector, as well as other characteristics of the apparatus described herein, a scintillation element 1½" in diameter and 2" long was employed and the output of photomultiplier 35 was coupled to a conventional single channel pulse height analyzer. Fig. 7 illustrates a typical pulse amplitude spectrum, which as is well-known is representative of the energy of intercepted gamma radiation. There is shown an increase in photon flux due to Compton scattering build-up effect as energy decreases until, in the vicinity of 100 k.e.v., photoelectric absorption begins to appear, causing a maximum in the spectrum, followed by a sharp decrease as the curve procedes to still lower energies.

In the experiments to be described, laboratory type formations were employed including limestone with a six inch borehole, and sand plus water with a range of borehole sizes. The densities of these formations are illustrated in Fig. 4 where a realistic range of densities (2.0–2.7 gms./cc.) is included. Borehole fluids employed afforded a realistic density range from 1.0 to 2.0 gms./cc. With this experimental set-up various S—D spacings were utilized yielding ratios of counting rates observed in the two formations ranging from 1.7 to 2.4 as the S—D spacing was increased from 24 cms. to 40 cms.

Figure 8:
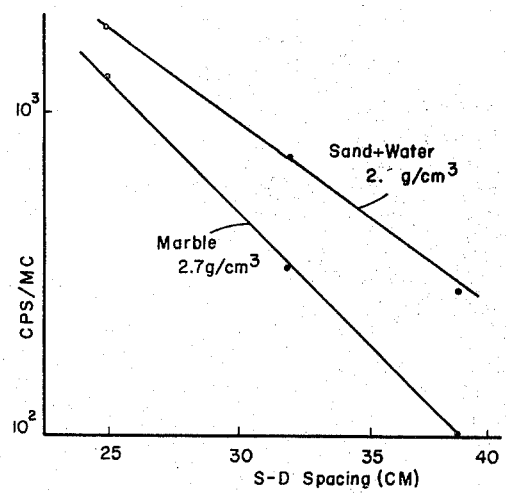

It will be observed from Fig. 8, which summarizes the data, that resolution, or the degree to which variations in density may be indicated varies directly with spacing, but the counting rate decreases quite markedly with spacing.

Figure 9:
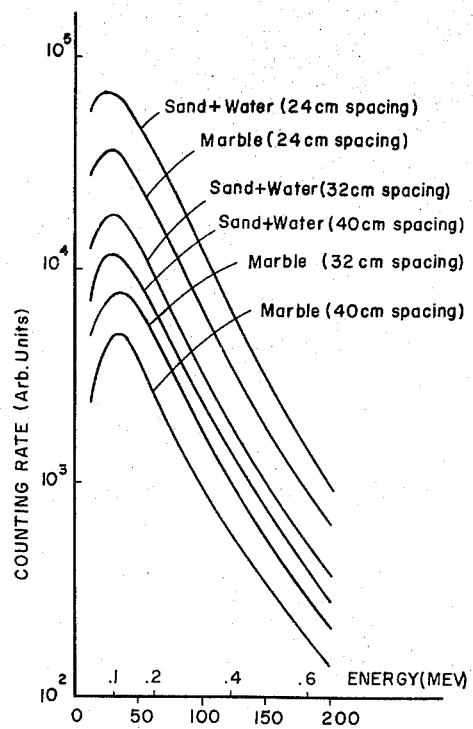

Additional differential pulse height distributions obtained by using a cobalt 60 source recessed ⅔" behind face 21 (Fig. 2) and recording the gamma radiation above 70 k.e.v. are included in Fig. 9 wherein the various curves, illustrative of certain formations and S—D spacings, are plotted in terms of counting rate versus pulse height. An approximate energy scale is shown in Figs. 8 and 9 for purposes of orientation.

Of course, counting rate may be raised by increasing the strength of the source. However, consideration of cost and health hazard make the use of a low source strength very desirable. In addition, the sidewall-engaging face of instrument 16 (Fig. 2) may not be of excessive length since its association with the sidewall of the borehole may be adversely affected thereby leading to undesirable perturbations in the log caused by varying amounts of drilling mud in front of face 21. With these considerations in view, an S—D spacing of 15 inches for an approximately fifty millicurie cobalt 60 source may be preferable.

It was noted that by setting the equipment to accept gamma rays above 45 k.e.v. the counting rate was increased 50% without changing the resolution appreciably. If a level of 200 k.e.v. is employed, counting rate is reduced by approximately a factor of two. These results may be anticipated from the data of Fig. 9.

An approximation of the radius of investigation at an S—D spacing of 32 cm. was made by successively increasing the radius of a low density laboratory formation outside a borehole. The results of this experiment are included in Table I.

Table I

| Formation Radius Beyond Borehole | Total Counting Rate (Arbitrary Units) |
|---|---|
| 1½" | 261 |
| 2½" | 401 |
| 3½" | 590 |
| 7" | 865 |

It is evident from the data of Table I that more than one-half the total counting rate is contributed by material more than 2½" from the sidewall of the borehole. This fact is significant since it has been shown experimentally that sidewall devices of this type suggested heretofore have radii of investigation very much less than this, a fact which makes them nearly useless for formation density logging.

Figure 10:
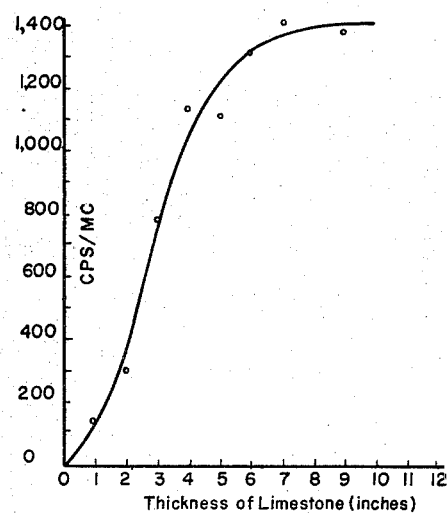

Another more refined experiment was performed using varying thicknesses of limestone and a 38.5 cm. S—D spacing. The results are plotted along a curve in Fig. 10 which indicates a depth of investigation between two and six inches.

Turning now to the problem of maintaining a desired high accuracy in the density measurements obtained with the apparatus of Figs. 1 and 2, various factors beyond the $$\left(\frac{Z}{A}\right) \text{ and } \rho_\text{r}$$

effects described above which are of importance in this connection will now be examined. These factors are borehole size effect, the effect of mud density and the effect of mud cake.

To indicate the means by which the first of these deleterious factors, namely borehole size effect, is practically eliminated, experiments were performed in a formation whose density differs most from that of the drilling mud, since the largest fractional effect on counting rate due to borehole size should occur under these conditions. Hence, the gamma ray response in a laboratory limestone formation, using water as mud, was measured as a function of borehole size. The results of this experiment indicated only about a 4% increase in counting rate as borehole diameter increased from 6" to 10", thus showing the present invention to be relatively insensitive to borehole size, in contrast to conventional equipment which is not maintained against the sidewall of the borehole or shielded in the unique fashion of Fig. 2. Further improvement in this factor may be achieved by suitably enlarging the sides or "cheeks" of sidewall-engaging face 21 (Fig. 2) in a lateral direction so that a better conformance with the sidewall of an average 8" borehole may be obtained.

The mud density effect is especially detrimental to the accuracy of measurements made with conventional, non-sidewall equipment or with sidewall equipment not shielded as in Fig. 2.

In the experiments for evaluating mud density effects, two "laboratory muds" were used, one consisting of water and the other a mixture of sand and water, simulating an eight pound mud and a sixteen pound mud, respectively. These "muds" are representative of a range of mud weights utilized in drilling operations. Measurements were carried out in a laboratory limestone formation since the effect is expected to be largest in the most dense formations. Further, a laboratory device with individual, longitudinally spaced source and detector shields was used.

As the "mud" was changed from 8 lbs. to 16 lbs. in a 10" laboratory borehole using an S—D spacing of 38.5 cm. (15"), a counting rate decrease of 11% was found.

A 2" thick lead slab having the diameter of the 10" borehole, but of "half-moon" configuration was next interposed between the source and the detector with the curved edge against the borehole wall. It was found that this reduced the mud density effect to only 3%. It was further noted that the absolute counting rates decreased by 9%, thus indicating that at least 9% of the detected gamma rays spend part of their total path between the source and detector in the borehole fluid at this large spacing, if no intervening shield is used.

For this reason, the space between the source and the detector in the construction illustrated in Fig. 2 is filled with lead; actually all the lead shown is not needed for shielding, but rather for mud displacement. A reduction in the weight of instrument 16 may be achieved by removing some of the lead between the source and detector, leaving enough to provide adequate gamma ray shielding. To strengthen the assembly, the resulting space may be filled with any other suitable material of light weight, such as aluminum.

In addition, mud density effects may be further reduced by enlarging the "cheeks" of face 21 in the manner suggested hereinbefore in connection with borehole size effects.

It is found that the most serious effect which must be considered is the one produced by mud cake on the sidewall of the borehole. Since, as in the case of the borehole size effect, it is expected that the largest effect occurs for the largest contrast between formation density and mud cake density, experiments were performed in a limestone formation using laboratory "mud cakes" 3/16" thick (1.2 grams/cm.³) and 1/4" thick (2.1 grams/cm.³).

The longitudinally separated source and detector shield housings were employed and with the source located at the window of its cavity, the 1.2 grams/cm.³ "mud cake" gave a 15% increase in counting rate for a 32 cm. S—D spacing, as compared with no "mud cake." Recessing the source by 1/2" reduced the effect to 11% thus indicating that mud cake affects the counting rate at least partly by presenting a shunt transmission path for gamma rays emitted from the source toward the detector at relatively small angles relative to the axis of the borehole.

An investigation of the relationship of the mud cake effect with respect to the energy spectrum was conducted for a 32 cm. S—D spacing, and a 1/4" thick 2.1 grams/cm.³ "mud cake." At a bias in discriminator 56 (Fig. 1A) such that gamma ray energies above 45 k.e.v. were detected, the mud cake effect was found to be 12%. With a bias set to detect gamma rays above 450 k.e.v., the mud cake effect dropped to 8%. Thus, the mud cake effect can be reduced by utilizing those gamma rays which have the smallest probability of interaction with the mud cake, either by virtue of their low attenuation coefficient in the mud cake (higher energy gamma rays) or by virtue of the fact that only a small part of their total path from source to detector is spent in the mud cake.

A phenomenological analysis of this effect assumes an exponential attenuation of gamma rays along some curved path between the source and the detector. The counting rate for fixed source strength is proportional to the transmission, T, and this may be expressed as follows:

$$T = e^{-\mu x} \quad (10)$$

where $\mu$ is an effective attenuation coefficient and $x$ is the distance along the curved path. Now suppose that part of the path in the formation is replaced by a path through the mud cake having a lower attenuation coefficient, which for the moment is assumed to be zero. Then the change in transmission, $dT$, is $$dT = -\mu e^{-\mu x} dx \quad (11)$$

or, from Equation 10, $$dT = -\mu T dx \quad (12)$$

The fractional change in transmission for a fractional change in path length $$\frac{dx}{x}$$

is $$\frac{dT}{T} = -\mu x \frac{dx}{x} \quad (13)$$

or $$\left(\frac{dT}{T}\right) = \ln T \left(\frac{dx}{x}\right) \quad (14)$$

In logging with a source of gamma rays and a detector of gamma rays, very small transmissions occur. These may be of the order of $10^{-3}$ to $10^{-4}$ for which ln T is a number of relatively large magnitude. Thus, even if $$\frac{dx}{x}$$

the fractional change in path length through the formation, is small, it is multiplied by a large number, ln T. Hence the fractional change in T, and thus in the counting rate, may be appreciable.

Of course, this should be considered as a rough model because T is not strictly exponential, build-up has not been included, and the effective attenuation coefficient of a mud cake is not equal to zero. However, recognition of the nature of the effect allows the novel device described below to reduce the mud cake effect in practical cases.

Figure 11:
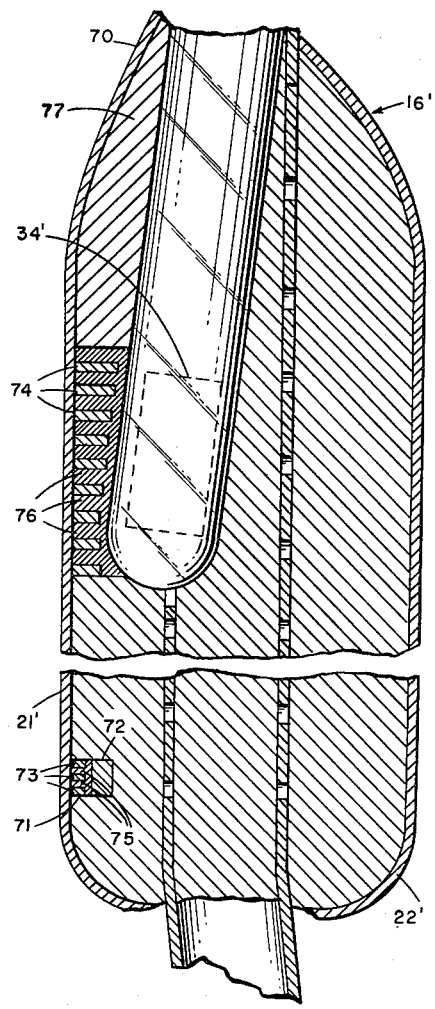
Figs. 11 and 12 represent modifications which may be made to the arrangement of Fig. 2.

In order to reduce the effects of mud cake, the apparatus of Fig. 2 may be modified in the manner shown in Fig. 11. A modified instrument 16' is illustrated wherein container 22' has a continuous portion 70 covering sidewall-engaging face 21'. An enlarged source opening 71 receives a pellet 72 of $Hg^{203}$ or other low energy gamma ray source and a plurality of shield louvers 73, disposed in parallel, horizontally-oriented planes, are positioned between container portion 70 and source 72. A low energy source is preferred in this embodiment in order to achieve a desired collimation with relatively thin louvers.

A similar group of louvers 74 are positioned between container portion 70 and the scintillation elements 34', shown in dash outline, and a modified aluminum member 77 extends above louvers 74.

The shield louvers 73 and 74 may be constructed of lead and the gamma ray transparent spaces between them filled with a material of low gamma ray absorption coefficient such as hydrogenous plastic or beryllium, designated by the numerals 75 and 76.

With the modified arrangement, all gamma rays from source 72 enter the earth formations in a direction transverse to the mud cake and gamma rays are intercepted by the detector 34' if they are essentially transverse to the mud cake. Accordingly, the mean thickness of mud cake traversed by gamma rays is kept at a minimum and mud cake effect is reduced.

Figure 12:
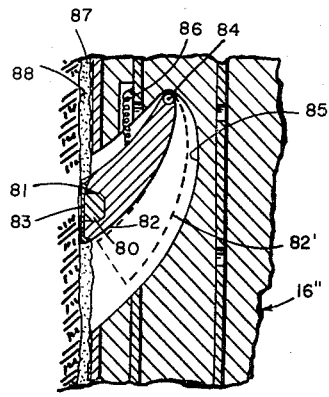

Another arrangement for reducing mud cake effect is shown in Fig. 12 whereby the gamma ray source is brought in close association with the formations. To this end, a source 80 is positioned in a cavity 81 at the front end of a knife member 82. Member 82 may be constructed of Hevimet and source 80 may be radioactive mercury of atomic weight 203 which emits gamma rays of relatively low energy. Hence, knife 82 may be relatively small and yet effectively block all gamma radiation except that emitted in a forward direction through a relatively thin, tungsten carbide cutting edge 83.

Knife 82 is pivotally supported at its other end by a pin 84 extending transversely through a longitudinal slot 85 in the front portion of the modified instrument 16'. The slot is large enough so that knife 82 may retract to a "hidden" position, illustrated in dash outline 82', and a spring 86 biases the knife about its pivot 84. Thus, the knife is urged into engagement with mud cake 87, and as the instrument is drawn upwardly through the borehole, cutting edge 83 permits the knife to penetrate the mud cake. Accordingly, source 80 is brought into close association with formation material 88 and the mud cake effect may be reduced by approximately one half.

If desired, knife 82 may be connected to a suitable mechanical linkage associated with detector housing 33. In this way the housing 33 may be displaced by an appropriate amount with pivotal movement of the knife so as to maintain a given S—D spacing.

It has been found that by using $Hg^{203}$ as a gamma ray source, increased density resolution may be obtained for a given longitudinal length of the sidewall-engaging instrument. If desired, a given resolution, achieved with a Ra or $Co^{60}$ source may be maintained while the length of the instrument is reduced. Accordingly, a better association between the instrument and the sidewall of the borehole leads to greater precision in density measurements obtained with the apparatus embodying the present invention.

To help in understanding the operation of this embodiment of the invention, experiments were conducted using a $Co^{60}$ source and a $Hg^{203}$ source and a spectrum-analyzing gamma ray detector.

Figure 13:
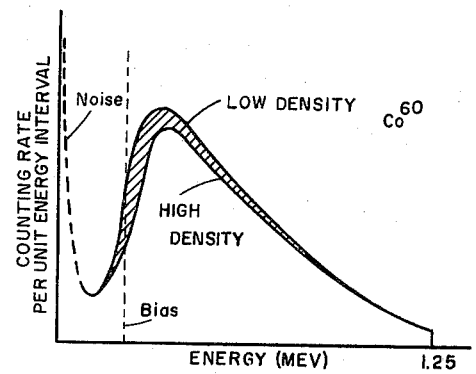
Figs. 13 and 14 are graphs which are helpful in explaining the operation of another embodiment of the invention.

As a result of irradiation with gamma radiation at energies of 1.17 and 1.33 m.e.v. from $Co^{60}$ having an average of 1.25 m.e.v., the detection equipment derives the curves for high and low densities illustrated in Fig. 13. An assumed bias level is illustrated by a vertical line denoted "bias," introduced to show how discriminator 56 of Fig. 1A might be adjusted to eliminate extraneous noise pulses. The ratio of the cross-hatched area enclosed by the low and high density curves and the bias line to the area under one of these curves defines the resolution of the apparatus.

Figure 14:
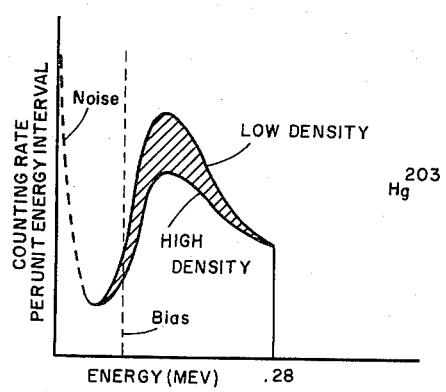

In Fig. 14, the same type of illustration for the $Hg^{203}$ source (emitting gamma radiation at 0.28 m.e.v.) is employed, and again the density resolution is defined in the same way as above. A visual comparison of Figs. 13 and 14 readily illustrates that the embodiment utilizing the lower energy source provides increased resolution.

Figure 15:
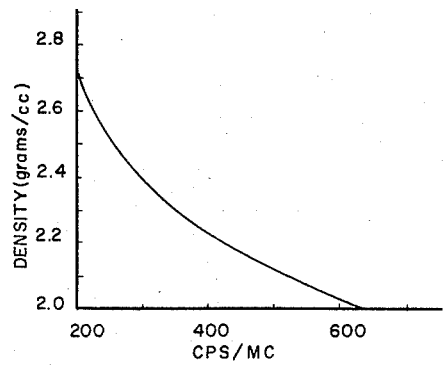
Fig. 15 is a graph illustrating a typical calibration curve for the apparatus of Figs. 1 and 2.

Fig. 15 represents a typical calibration curve for the apparatus illustrated in Figs. 1 and 2 plotted in terms of density in grams per $cm.^3$ versus counts per second per millicurie (source). From this curve, it may be seen that the apparatus desirably provide high resolution; there is a large change in counting rate for a relatively small density variation. Accordingly, small uncertainties in counting rate due to either statistical fluctuations or systematic causes, such as mud cake, mud density, etc., do not appreciably reduce the accuracy of the density measurements. It is, therefore, apparent that gamma ray logging apparatus constructed in accordance with the present invention affords greater accuracy than heretofore attainable.

Although specific gamma ray sources have been enumerated, such as $Co^{60}$, $Hg^{203}$, and radium, obviously any other source may be utilized whether of the naturally radioactive type or wherein gamma radiation is generated through the acceleration of particles prior to impingement on a suitable target material. Moreover, other detectors may be employed. For example, an ionization chamber may be suitably arranged for use in the apparatus embodying the invention.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

We claim:

1. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation supported within said instrument in the vicinity of said wall-engaging face; and a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument.

2. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole, whereby the longitudinal dimension of the portion of said instrument including said face is minimized; means for maintaining said wall-engaging face in engagement with the sidewall of the borehole and in essentially parallel relation to the axis of the borehole; a source of gamma radiation supported within said instrument in the vicinity of said wall-engaging face; and a detection system including a gamma-ray-responsive device supported within said instrument in relatively close association with said wall-engaging face and in longitudinally spaced relation from said source relative to the axis of the borehole, and an element coupled to said gamma-ray responsive device and supported within said extension of said instrument.

3. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation supported within said instrument in the vicinity of said wall-engaging face; a detection system including a gamma-ray-responsive device supported within said instrument in the vicinity of said wall-engaging face and in longitudinally spaced relation from said source relative to the axis of the borehole, and an element for deriving a signal representing a characteristic of gamma radiation incident on said gamma-ray-responsive device and supported within said extension of said instrument; and means for producing indications of said signal as a function of depth in the borehole.

4. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole, and said instrument having a bore substantially aligned with said extension; means for maintaining said wall-engaging face in engagement with the sidewall of the borehole; a source of gamma radiation supported within said instrument in the vicinity of said wall-engaging face; and a detection system including a gamma-ray-responsive scintillation device supported within said bore of said instrument in the vicinity of said wall-engaging face and in longitudinally spaced relation from said source relative to the axis of the borehole, and a photo-electric element optically coupled to said gamma-ray-responsive device and supported in part, within said bore of said instrument and extending into said extension of said instrument.

5. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation supported within said instrument in the vicinity of said wall-engaging face; a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument; and a gamma ray shield material substantially filling said instrument.

6. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation supported within said instrument in the vicinity of said wall-engaging face; a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument; and a gamma-ray-collimating system supported between said wall-engaging face and each of said source and said gamma-ray-responsive device.

7. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation supported within said instrument in a vicinity of said wall-engaging face; a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument; and a gamma-ray-collimating system including a plurality of members of a gamma-ray-shielding material defining substantially parallel, longitudinally spaced planes disposed transversely to the axis of the borehole and occurring in two groups, one of said groups being supported between said wall-engaging face and said source and the other of said groups being disposed between said wall-engaging face and said gamma-ray-responsive device.

8. Apparatus for investigating earth formations traversed by a well or borehole comprising: an instrument adapted to be passed through the borehole and including a wall-engaging face; means for maintaining said wall-engaging face in engagement with the sidewall of the borehole; a source of gamma radiation supported within said instrument in the vicinity of said wall-engaging face; and a detection system including a gamma-ray-responsive device supported within said instrument in the vicinity of said wall-engaging face and in longitudinally spaced relation from said source relative to the axis of the borehole; and a gamma-ray-collimating system including a plurality of members of a gamma-ray-shielding material defining substantially parallel, longitudinally spaced planes disposed transversely to the axis of the borehole and occurring in two groups, one of said groups being supported between said wall-engaging face and said source and the other of said groups being disposed between said wall-engaging face and said gamma-ray-responsive device.

9. Apparatus for investigating earth formations traversed by a well or borehole comprising: an instrument adapted to be passed through the borehole including a wall-engaging face, an extension tilted relative to a longitudinal line of said wall-engaging face in a direction toward the axis of the borehole, and a carrier movable relative to said instrument toward the sidewall of the borehole; means for maintaining said wall-engaging face in engagement with the sidewall of the borehole; a source of gamma radiation supported within said carrier; and a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument.

10. Apparatus for investigating earth formations traversed by a well or borehole having a mudcake on the sidewall thereof comprising: an instrument adapted to be passed through the borehole including a wall-engaging face, an extension tilted relative to a longitudinal line of said wall-engaging face in a direction toward the axis of the borehole, and a carrier movable relative to said instrument and biased toward the sidewall of the borehole, said carrier including an end portion constructed of a gamma-ray-shielding material having a chamber, and having a knife-like edge for cutting through mudcake; means for maintaining said wall-engaging face in engagement with the sidewall of the borehole; a source of gamma radiation disposed within said chamber of said carrier; and a detection system including a gamma-ray-responsive device supported within said instrument in the vicinity of said wall-engaging face and in longitudinally spaced relation from said source relative to the axis of the borehole, and an element coupled to said gamma-ray-responsive device and supported within said extension of said instrument.

11. Apparatus for investigating earth formations traversed by a well or borehole having a mudcake on the sidewall thereof comprising: an instrument adapted to be passed through the borehole including a wall-engaging face, and a carrier movable relative to said instrument and biased toward the sidewall of the borehole, said carrier including an end portion constructed of a gamma-ray-shielding material having a chamber, and having a knife-like edge for cutting through mudcake; means for maintaining said wall-engaging face in engagement with the sidewall of the borehole; a source of gamma radiation disposed within said chamber of said carrier; and a detection system including a gamma-ray-responsive device supported within said instrument in the vicinity of said wall-engaging face and in longitudinally spaced relation from said source relative to the axis of the borehole.

12. Apparatus for investigating earth formations traversed by a well or borehole comprising: an instrument adapted to be passed through the borehole including a wall-engaging face and an extension tilted relative to a longitudinal line of said wall-engaging face in a direction toward the axis of the borehole; means for maintaining said wall-engaging face in engagement with the sidewall of the borehole; a source of gamma radiation, having an energy such that a high density resolution resulting from low transmission occurs, supported within said instrument in the vicinity of said wall-engaging face; and a detection system including a gamma-ray-responsive device supported within said instrument in the vicinity of said wall-engaging face and in longitudinally spaced relation from said source relative to the axis of the borehole and an element coupled to said gamma-ray-responsive device and supported within said extension of said instrument.

References Cited in the file of this patent

UNITED STATES PATENTS

| | | |
|---|---|---|
| 2,469,461 | Russell | May 10, 1949 |
| 2,659,011 | Youmans et al. | Nov. 10, 1953 |
| 2,688,703 | Di Giovanni et al. | Sept. 7, 1954 |